H. S. BROWN.
JOINT FOR WOODWORK.
APPLICATION FILED MAR. 24, 1917.
1,236,538.
Patented Aug. 14, 1917.
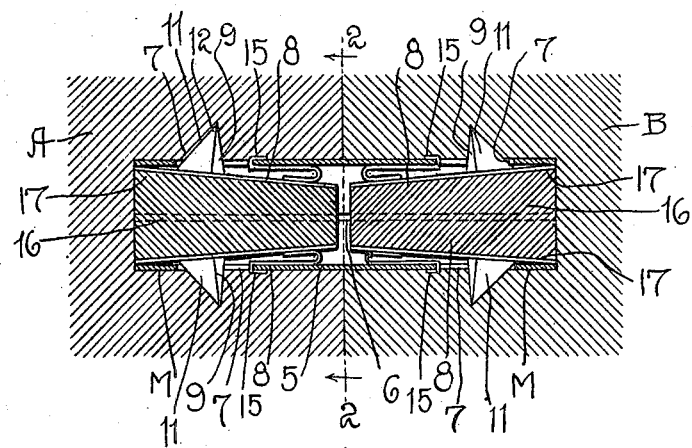
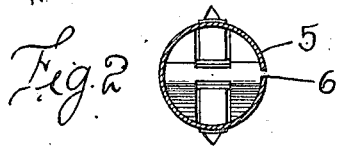
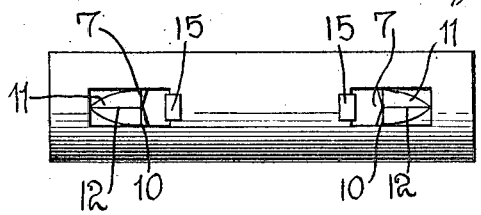
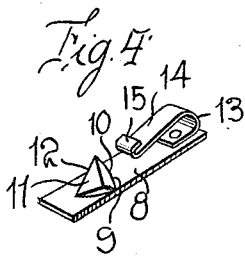
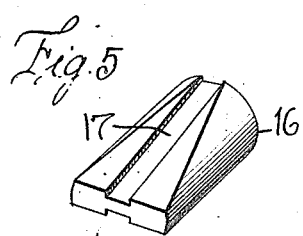
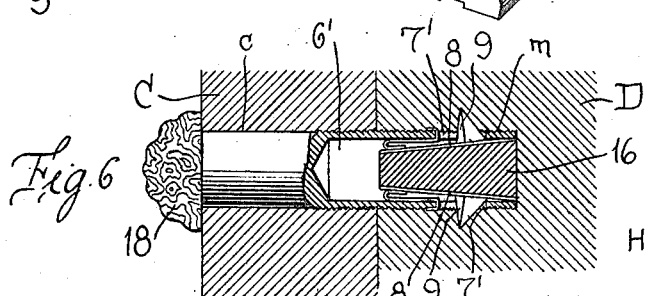
Inventor
H. S. BROWN
By Watson E. Coleman
Attorney

UNITED STATES PATENT OFFICE.

HORATIO S. BROWN, OF WILLIAMS, MINNESOTA.

JOINT FOR WOODWORK.

1,236,538.     Specification of Letters Patent.     Patented Aug. 14, 1917.

Application filed March 24, 1917. Serial No. 157,206.

*To all whom it may concern:*

Be it known that I, HORATIO S. BROWN, a citizen of the United States, residing at Williams, in the county of Beltrami and State of Minnesota, have invented certain new and useful Improvements in Joints for Woodwork, of which the following is a specification, reference being had to the accompanying drawings.

This invention relates to an improved joint for woodwork and has for its primary object to provide a very simple device for tightly and securely joining adjacent pieces or sections of cabinet work or wooden frame structures in an expeditious manner, and with a minimum of manual labor.

It is another important object of the invention to provide a joint device of the above character which is so constructed that the necessity of providing a tenon upon one of the pieces to be joined is obviated, both pieces being mortised to receive the joint device, said device being rendered effective to securely join and hold the parts against relative movement by the mere operation of forcing the parts toward each other.

It is a further general object of my invention to improve and simplify the construction of devices of the above character whereby the same are rendered efficient and reliable in practical use and capable of manufacture at relatively small cost.

With the above and other objects in view, my invention consists in the novel features of construction, combination, and arrangement of parts to be hereinafter more fully described, claimed and illustrated in the accompanying drawing, in which, Figure 1 is a longitudinal section through my improved joint device, showing the same in operative position connecting the two parts together;

Fig. 2 is a section taken on the line 2—2 of Fig. 1;

Fig. 3 is a side elevation of the joint;

Fig. 4 is a detail perspective view of one of the clenching members;

Fig. 5 is a similar view of one of the wedge blocks; and

Fig. 6 is a longitudinal section showing a slightly modified form of the device.

Referring in detail to the drawings, A and B respectively, designate the two parts to be joined together, each of which is provided with a mortise M.

My improved joint member, in its preferred form, includes a sheet metal tube 5 which is rolled or otherwise formed from a flat, metal plate and has its edges slightly separated or unconnected as shown at 6, so that the tube, when subjected to internal pressure, may expand. This tube, in spaced relation to each of its ends and at diametrically opposite points, is provided with longitudinal slots 7.

Each of the clenching members illustrated in detail in Fig. 4, consists of a narrow, elongated, metal base plate 8 which is provided in spaced relation to one of its ends with a transversely disposed clenching lug 9 extending from one side of the plate at right angles thereto, said lug having a sharpened edge, as indicated at 10. A web 11 is integrally connected to one side of this lug and to the base plate 9, and extends longitudinally of the latter, the outer edge of said web being inclined with respect to the base plate at an angle substantially 45° and also sharpened as shown at 12. This sharpened edge of the web extends from the outer extremity of the lug 9 to the face of the base plate 8 and, at its latter end, is disposed in spaced relation to the end of the plate. To the opposite ends of the base plate and on the same face thereof as the lug 9, one end of a longitudinally extending leaf spring 13 is riveted or otherwise securely fixed. This plate is bent or returned upon itself to provide the free, resilient, end portion 14, and the terminal 15 thereof is reversely bent to provide a hook thereon for a purpose to be presently related.

In Fig. 5 of the drawing, I have shown one of the cylindrical wedge blocks 16, said wedge block being of longitudinal, tapering form and having opposite flattened faces, each of which is provided with a groove or channel 17. One of these wedge blocks coöperates with each pair of the clenching members, the base plates 8 being slidably engaged in the groove 17.

In using the device, it will be understood that the mortise M in each of the parts to be joined, is of a depth exactly one-half the length of the tube 6. A pair of the clenching members is first arranged in each end of the tube with the hooks 15 on the ends of the leaf springs 13 projecting outwardly through the slots 7 and engaged over the inner end edges thereof. The smaller end of one of the wedge blocks 16 is then inserted between the outer ends of the opposed base plates 8, said plates engaging in the respective channels 17 of the wedge block. The end portion of the spring 13 is so spaced with respect to the plate 8 that the outer ends of the lugs 9 are disposed in the slots 7 and flush with the outer surface of the tube 6 when the device is inserted into the mortise M and before there is any wedging action of the blocks 16 upon the plates 8. As the two parts to be joined are forced together, the larger ends of the wedge blocks 16 are engaged by the base walls of the mortises M and said wedge blocks forced into the opposite ends of the tube 6. The base walls of the grooves 17 in the wedge blocks exert a lateral outward pressure against the outer ends of the plates 8 and thereby project the lugs 9 and webs 11 outwardly through the slots 7 of the tube and cause the same to bite into the walls of the mortises M. When the parts A and B have been pushed together with their opposed edges in abutting contact, the outer ends of the wedge blocks 16 will be flush with the ends of the tube 6 and entirely disposed within said tube. These wedge blocks also exert an expansive pressure against the walls of the tube so as to urge the tube walls into tight frictional engagement with the walls of the mortises. The plates 8 of the clenching devices being disposed within the channels or grooves 17 of the wedge blocks effectively prevent any circumferential displacement of the clenching members with respect to the tube.

In Fig. 6, I have illustrated a slightly modified form of the joint or fastening member wherein only one pair of the clenching members and one of the wedge blocks is employed. In this construction, the tube 6' is provided upon one of its ends with an ornamental head designated 18, and adjacent to the other end of the tube the opposed slots 7' are formed in the wall thereof. The clenching members are arranged within the other end of the tube in the manner above explained and the wedge block 16 engaged between said members. This form of the device is used for fastening the parts of a framework or other structure together, such as indicated at C and D, the part C having an opening $c$ therein and the part D being provided with a mortise $m$. The sleeve 6 is inserted through the opening $c$ and driven into the mortise so that the larger end of the wedge block 16 will engage the base wall of the mortise and operate in the manner above described to project the clenching lugs outwardly through the slots in the wall of the tube. When the inner face of the ornamental head 18 engages the outer face of the part C, the wedge block will be entirely disposed within the tube and the clenching lugs projected to their full extent. The flat side faces of the lugs 9 engage the inner end edges of the slots in the tube 6 in both forms of the device so that a tight joint will be obtained. It will be readily seen that as soon as the clenching lug 9 engages in the wood, the longitudinal movement of said lugs will stop, and the spring 13 will be bowed or bent out of its normal form until the ends of the tube abut against the base walls of the mortises and the lugs 9 strike the outer ends of the slots 7 in the tube.

From the foregoing description, taken in connection with the accompanying drawing, the construction, manner of use, and several advantages of the invention will be clearly and fully understood. By means of my improved joint device, the joining or connecting of various parts of furniture or other wooden structures may be easily and quickly accomplished and the parts connected securely together and held against all possibility of relative movement. The necessity of providing a mortise on one piece to fit within a tenon on the opposed piece is obviated, and as these tenons must be accurately formed to make a perfect fit in the mortise, much time and work is thus saved. The improved joint device may be manufactured in various sizes and at relatively small cost.

While I have herein shown and described the preferred construction and arrangement of the several elements employed, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:

1. A dowel for joining wooden parts comprising a tube provided with diametrically opposed slots in its wall, clenching members disposed within the tube, yieldable means connected to each of said members to resist their outward movement through said slots, and a wedge block insertible into the tube between the clenching members and adapted to engage the base wall of the mortise in one of the parts to project the clenching members outwardly through said slots and into engagement with said part.

2. A dowel for joining wooden parts comprising a tube provided with diametrically opposed slots in its wall, clenching members disposed within the tube, yieldable means connected to each of said members to resist their outward movement through said slots, and a wedge block insertible into the tube between the clenching members and adapted to engage the base wall of the mortise in one of the parts to project the clenching members outwardly through said slots and into engagement with said part, the yieldable means for each clenching member also co-acting with the tube and permitting of a longitudinal movement of the tube and wedge blocks with respect to the clenching members.

3. A dowel for joining wooden parts comprising a tube provided with diametrically opposed, longitudinal slots adjacent each of its ends, a pair of clenching members arranged in each end of the tube, a spring connected to each of the clenching members and normally acting to yieldingly retain the same in the wood, and wedge members insertible into each end of the tube between the clenching members therein to project said members outwardly through the slots in the tube and into engagement with the wood part, the spring of each clenching member being engaged over one end edge of the slot and permitting of the longitudinal movement of said wedge members with respect to the clenching members.

4. The combination recited in claim 3, further characterized by the tube being expansible under the action of the wedge blocks to expand the tube into tight frictional engagement with the mortises in the wood parts.

In testimony whereof I hereunto affix my signature in the presence of two witnesses.

HORATIO S. BROWN.

Witnesses:
R. H. SANFORD,
A. W. ATWATER.